No. 738,008. PATENTED SEPT. 1, 1903.
F. L. DECKER.
NUT LOCK.
APPLICATION FILED MAR. 14, 1903.
NO MODEL. 2 SHEETS—SHEET 1.

WITNESSES:

INVENTOR
F. L. Decker,
BY Victor J. Evans
Attorney

No. 738,008. PATENTED SEPT. 1, 1903.
F. L. DECKER.
NUT LOCK.
APPLICATION FILED MAR. 14, 1903.
NO MODEL. 2 SHEETS—SHEET 2.

Witnesses

Inventor
F. L. Decker,
By Victor J. Evans
Attorney

No. 738,008. Patented September 1, 1903.

UNITED STATES PATENT OFFICE.

FRANK L. DECKER, OF SANDFORK, WEST VIRGINIA, ASSIGNOR OF ONE-HALF TO LOW C. PFOUTS, OF HURST, WEST VIRGINIA.

NUT-LOCK.

SPECIFICATION forming part of Letters Patent No. 738,008, dated September 1, 1903.

Application filed March 14, 1903. Serial No. 147,812. (No model.)

*To all whom it may concern:*

Be it known that I, FRANK L. DECKER, a citizen of the United States, residing at Sandfork, in the county of Gilmer and State of West Virginia, have invented new and useful Improvements in Nut-Locks, of which the following is a specification.

This invention relates to nut-locks, the principal object thereof being to provide an efficient construction of lock carried by the nut which can be operated to impinge upon the threads of a bolt to securely fasten the nut against turning on the bolt.

Another object is to provide a lock which can be forced against the threads of the bolt at any determined point thereon.

The invention is particularly adapted for use on bolts used on heavy machinery, such as engines, &c., where excessive vibration occurs, but is equally applicable to any-size nut which can be threaded on a bolt.

The invention consists in providing a transverse recess or slot in the nut to receive a sliding dog having a shoulder thereon and a pivoted cam-lever for projecting the dog through the slot and into engagement with the threads on a bolt, whereby the nut will be securely locked to the bolt.

The novel construction of the parts and arrangements of parts will be specifically set forth hereinafter, reference being had to the accompanying drawings, in which—

Figure 1:
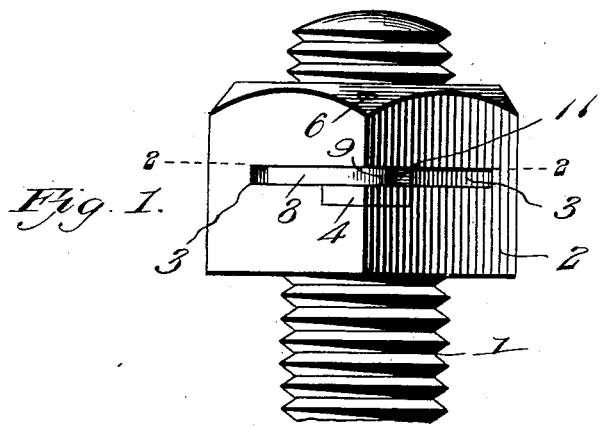
Figure 2:
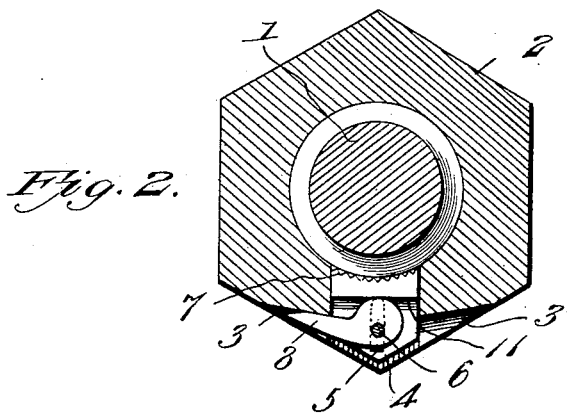
Figure 3:
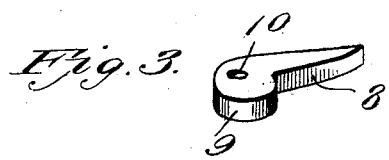
Figure 4:
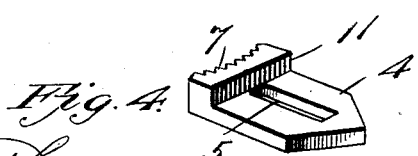
Figure 5:
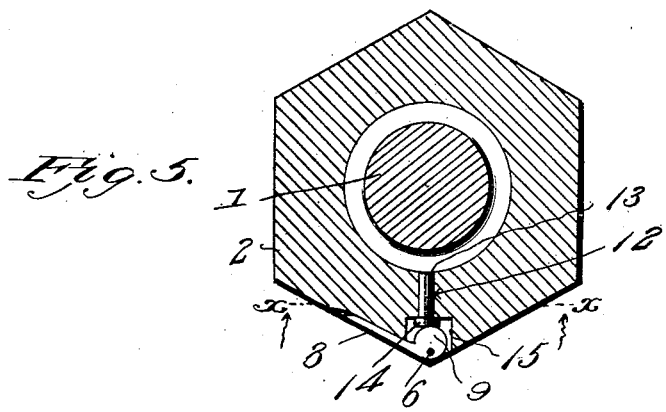
Figure 6:
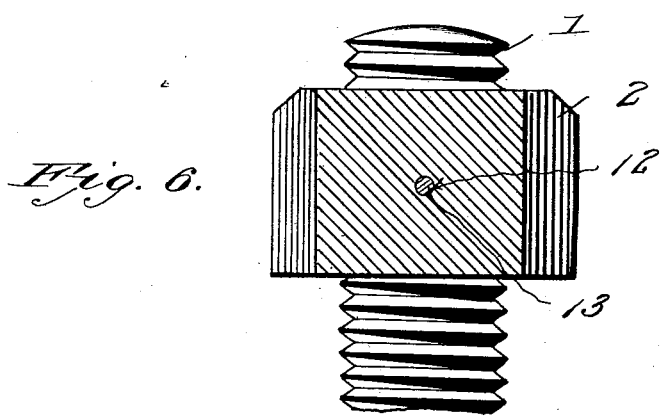
Figure 7:
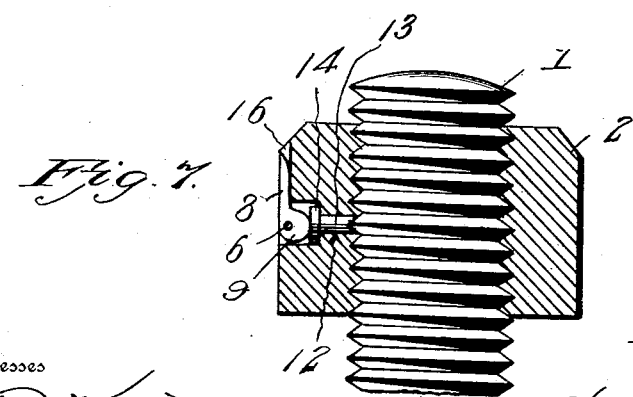

Figure 1 is a view in elevation of a portion of a bolt, showing the nut applied thereto. Fig. 2 is a transverse sectional view on the line 2 2 of Fig. 1. Fig. 3 is a detail perspective view of the cam-lever. Fig. 4 is a similar view of the sliding dog. Fig. 5 is a section through a nut, showing a modified form of locking means. Fig. 6 is a section on line *x x* of Fig. 5; and Fig. 7 is a longitudinal section through a nut, showing a further modification.

The reference-numeral 1 designates a bolt on which is threaded a nut 2. The nut is provided with a transverse slot 3 and which extends through to the threads of the nut and receives a sliding dog 4. This dog is formed with a longitudinal slot 5, through which projects a vertical pin 6, driven through the nut and acting as a stop to limit the movement of the dog. The inner edge of the dog is curved on an arc conforming to the contour of the threads of the bolt 1. The teeth 7, carried by the arcuate portion of the dog 4, are arranged at right angles to the edges of the threads, so that when the dog is projected through the slot the teeth will engage the threads in a manner to offer the most resistance against movement of the nut.

The device for projecting the dog is illustrated in Fig. 3 and comprises a lever 8, having a cam or eccentric 9 on one end thereof, which is provided with a perforation 10 to receive the pin 6, which passes through the slot 5 with the dog 4. This lever rests upon the top of the dog, and the cam-head 9 thereof is provided to bear against the shoulder or flange 11, formed near the inner terminal of the dog. Two of the edges of the slot 3 are cut away to permit a free movement of the lever 8, so the dog will be firmly forced against the threads of the bolt. The lever is of such form and construction that it will conform to the shape of the slot 3, whereby the lever will rest therein when in its locked position. In Fig. 2 the dog and lever are shown in position for locking the nut to the bolt. When the lever is swung in the opposite direction, however, the dog will be released from engagement with the threads, permitting the nut to be turned in either direction.

In Figs. 5 and 6 I have shown a modified form of fastening device having a cylindrical passage 12 in one side thereof within which is fitted a pin 13, having a serrated inner end. The head 14 is formed upon the outer end of this pin and is seated within the countersunk end 15 of the passage. A lever 8, having a cam-head 9, such as used in the construction hereinbefore described, is also employed in connection with this modification.

In the form illustrated in Fig. 7 I have shown the same parts illustrated in Figs. 5 and 6; but instead of providing a transversely-extending slot 3 I employ a longitudinally-exteding slot 16, within which the lever and its cam-head are fitted.

The particular advantage aside from the effective construction is the ease in manipulation, whereby the nut can be secured at any point upon the threaded shank of the bolt. For instance, if the bolts become drawn or loose from expansion due to the heat or vibration of the machinery the nut can be moved upon the threads and again locked thereto without employing any device other than that carried by the nut.

It will be apparent that minor changes in form and details of construction can be made without affecting the operation of the device, and I therefore reserve the right to make such changes and alterations as would properly suggest themselves and come within the scope of the following claims.

Having thus described the invention, what is claimed as new is—

1. In a nut-lock, the combination with a bolt; of a nut threaded thereon and having a slot in one of the side walls thereof, a sliding dog moving in the slot, one end of which is provided with teeth arranged at right angles to the edges of the threads on the bolt, a shoulder or flange formed on the dog, and a locking-lever to engage the flange, whereby the teeth on the dog will be projected against the edges of the threads.

2. In a nut-lock, the combination with a bolt; of a nut threaded thereon and provided with an opening extending therethrough to the threads thereof, a slotted dog carried by the nut and slidable in the opening, a pin projecting through the slot in the dog, and a cam-lever pivoted to the pin and bearing against the dog to project one end thereof against the threads on the bolt.

3. The combination with a nut; of a sliding dog carried thereby and provided with a toothed end, a flange or shoulder projecting from the dog, and a cam-lever pivoted adjacent to the dog and bearing against the flange, whereby the lever can be moved to slide the dog.

4. In a nut-lock, the combination with a nut having a slot therein, the edges of which are cut away at an angle to the sides of the slot, a sliding dog moving in the slot, one end of which is curved on an arc of a circle, teeth projecting from the arcuate end of the dog, a flange extending from the top of the dog, and a cam-lever for sliding the dog in the slot in the nut.

5. The combination with a nut having a passage therethrough to the threads thereof; of a dog slidably mounted within the passage and having teeth at its inner end, and a cam-lever pivoted within the nut and adapted to bear upon the dog.

In testimony whereof I affix my signature in presence of two witnesses.

FRANK L. DECKER.

Witnesses:
CHARLES W. GOFF,
JOHN RYAN.